(12) United States Patent
Watanabe

(10) Patent No.: US 7,990,910 B2
(45) Date of Patent: Aug. 2, 2011

(54) MOBILE STATION AND RECEPTION QUALITY MEASUREMENT METHOD

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 105 days.

(21) Appl. No.: 12/495,415

(22) Filed: Jun. 30, 2009

(65) Prior Publication Data
US 2010/0008246 A1 Jan. 14, 2010

(30) Foreign Application Priority Data

Jul. 8, 2008 (JP) ................................ 2008-178246

(51) Int. Cl.
*H04B 7/212* (2006.01)
(52) U.S. Cl. ......................... 370/324; 370/332; 370/350
(58) Field of Classification Search .................. 370/324, 370/332, 349, 350, 333, 395.62
See application file for complete search history.

(56) References Cited

U.S. PATENT DOCUMENTS

| 5,603,093 | A | * | 2/1997 | Yoshimi et al. | ............. | 455/63.1 |
| 6,526,039 | B1 | | 2/2003 | Dahlman et al. | | |
| 7,328,019 | B2 | * | 2/2008 | Nishikawa et al. | ........... | 455/436 |
| 7,532,889 | B2 | * | 5/2009 | Kim | ............................. | 455/442 |
| 2004/0128095 | A1 | * | 7/2004 | Oestreich | ........................ | 702/89 |
| 2008/0186949 | A1 | * | 8/2008 | Hafeez et al. | ................. | 370/350 |
| 2010/0014473 | A1 | * | 1/2010 | Ofuji et al. | ..................... | 370/329 |

FOREIGN PATENT DOCUMENTS

| JP | 2001-257656 | 9/2001 |
| JP | 2002-503913 | 2/2002 |
| JP | 2004-336279 | 11/2004 |
| JP | 2006-287672 | 10/2006 |

* cited by examiner

*Primary Examiner* — Brenda Pham
(74) *Attorney, Agent, or Firm* — Fujitsu Patent Center

(57) ABSTRACT

A reception quality measurement method includes instructing a mobile station existing in a cell to measure a reception quality of a signal sent by a second base station forming a cell with a frequency different from a frequency of the cell of the first base station; setting a period including a synchronizing timing for the first base station, by the mobile station; setting a plurality of measurement timings in the period, and measuring reception quality of the signals sent by the second base station at each of the measurement timings, by the mobile station; comparing the reception qualities measured at the measurement timings, and selecting an optimum reception quality, by the mobile station; and reporting the selected optimum reception quality to the first base station as the reception quality of the signal sent by the second base station, by the mobile station.

12 Claims, 19 Drawing Sheets

MOBILE STATION AND RECEPTION QUALITY MEASUREMENT METHOD

CROSS-REFERENCE TO RELATED APPLICATIONS

This application is based upon and claims the benefit of priority of the prior Japanese Patent Application No. 2008-178246, filed on Jul. 8, 2008, the entire contents of which are incorporated herein by reference.

FIELD

The present invention relates to a mobile station and a reception quality measurement method.

BACKGROUND

In recent years, mobile communication has been used for various purposes, such as voice communication, Internet access, streaming broadcast, distributions of rich contents (e.g. music, video, etc.). In this background, high speed mobile communication is in high demand, and the OFDM (Orthogonal Frequency Division Multiplexing) communication system has attracted public attention as a communication system suitable for high speed data communication.

In general, in an OFDM communication system, the transmission side maps data to be transmitted on each sub-carrier on a frequency axis, and executes an IFFT (Inverse Fast Fourier Transform) process so as to convert the data into a time axis transmission symbol. The reception side executes an FFT (Fast Fourier Transform) for a received signal along its time axis so as to demodulate the received data which has been mapped on the sub-carrier of the frequency region. At this time, an FFT window is set at the reception timing corresponding to the sent symbol timing, to properly demodulate the received data.

Next generation mobile phones and Mobile WiMAX have been considered for use with the OFDM communication system. When the OFDM communication system is used for such applications, a handover process is executed during movement between cells. In the handover process, the frequency of adjacent cells is not necessarily the same. Thus, mobile stations may switch the frequency to another frequency.

Explanations will now be made about a specific example of a handover process during the movement to another cell with a different frequency. FIG. 15 is an example of a wireless communication system. In this example, a mobile station 1 is present in a cell 3 where a frequency A is used and which is formed by a serving base station 2. The mobile station 1 is approaching a cell 5 where a frequency B is used and which is formed by a target base station 4. The serving base station is a radio base station to which the mobile station is connected, while the target base station is a radio base station which is a candidate for the handover process.

In the situation illustrated in FIG. 15, the serving base station 2 sends an instruction for measuring a wireless environment to the mobile station 1 in order to check whether it is appropriate to execute a handover process. For example, the measurement instruction instructs the mobile station 1 to execute a process (scanning process) for measuring the reception quality of a signal transmitted by an adjacent station (target base station). The mobile station 1 executes the scanning process, and reports a measurement result to the serving base station 2.

In this situation, the mobile station 1 executes the scanning process for measuring the reception quality of a signal having the frequency B that is different from the frequency A used for the communication with the serving base station 2. In the following explanations, a process for measuring the reception quality of a signal of a different frequency may be referred to as a "different frequency scanning process".

FIG. 16 is a diagram regarding a communication state before and after a different frequency scanning process. The mobile station 1 receives a measurement instruction from the serving base station 2 in a normal communication period for performing communication on the frequency A. Upon reception of the measurement instruction, the mobile station 1 switches the frequency to the frequency B in response to the instruction, and measures the reception quality of a signal sent by the target base station 4. Upon completion of the measurement, the mobile station 1 turns the frequency back into the frequency A in order to send the measurement result to the serving base station 2. In the following explanations, in the different frequency scanning process, the period for temporarily switching the frequency for measuring the reception quality of a signal to be sent by the target base station may be referred to as a "scanning period".

In this manner, conventionally, a synchronizing process is executed when measuring the reception quality of the signal sent by the target base station by temporarily switching the frequency. As described above, in the OFDM communication system, the timing for setting the FFT window needs to be appropriately adjusted in order to appropriately demodulate received data. However, as illustrated in FIG. 17, signals sent from the serving base station 2 and the target base station 4 are received by the mobile station 1 at a different timing based on a difference of transmission timings or a delay difference of transmission paths. Therefore, conventionally, a different frequency scanning process has been executed with a synchronizing process, in accordance with a procedure in FIG. 18.

FIG. 18 is a flowchart regarding a procedure of a conventional different frequency scanning process. As illustrated in FIG. 18, upon request of a different frequency scanning process from the serving base station (Yes in Step S11), the mobile station changes the frequency into the frequency of the target base station (Step S12).

The mobile station executes a frame/symbol synchronizing process in order to appropriately demodulate a signal from the target base station (Step S13). The frame/symbol synchronizing process is disclosed, for example, in patent document 1. The mobile station measures the reception quality of a signal sent by the target base station (Step S14), turns the frequency back into the frequency of the serving base station (Step S15), and sends the measurement result to the serving base station (Step S16).

However, a problem of extending a scanning period exists in a conventional reception quality measurement method for performing a synchronizing process before measuring the reception quality in a different frequency scanning period. The scanning period in the different frequency scanning process is a period in which communication is not able to be performed with the serving base station, that is, a period in which services (e.g., telephone communication) is not offered. However, the time requiring the synchronizing process increases as the movement speed of the mobile station increases.

FIG. 19 is a diagram of a simulation result of the time required for the timing synchronizing process. As illustrated in FIG. 19, when the moving velocity is 3 km/h, the synchronizing success probability is 100% for a period of receiving six frames. When the moving velocity is 60 km/h, a period for receiving 15 frames is needed to achieve a synchronizing success probability of 100%. Accordingly, the time required for the synchronizing process changes in accordance with the moving velocity of the mobile station. Thus, to appropriately execute the synchronizing process regardless of the moving velocity, a long period of time for executing the synchronizing process is set which results in the problem of extending the scanning period.

SUMMARY

According to an aspect of the invention, a mobile station includes a communication control unit which sets a period including a synchronizing timing for a first radio base station, in response to an instruction from the first radio base station forming a cell in which the mobile station exists, for measuring reception quality of a signal sent by a second radio base station forming a cell with a frequency different from a frequency used in the cell of the first radio base station; a timing setting unit which sets a plurality of measurement timings in a period set by the communication control unit so as to initiate measurement of the reception quality of the signal sent by the second radio base station at each of the measurement timings; a reception quality comparing unit which compares the reception qualities measured at the measurement timings set by the timing setting unit, and selects an optimum reception quality therefrom; and a control information generating unit which reports the optimum reception quality selected by the reception quality comparing unit to the first radio base station as the reception quality of the signal sent by the second radio base station.

According to an aspect of the invention, a reception quality measurement method includes instructing, from a first radio base station, a mobile station existing in a cell formed by the radio base station to measure the reception quality of a signal sent by a second radio base station forming a cell with a frequency different from a frequency of the cell of the first radio base station; setting a period including a synchronizing timing for the first radio base station, by the mobile station; setting a plurality of measurement timings in the period, and measuring a reception quality of the signal sent by the second radio base station at each of the measurement timings, by the mobile station; comparing the reception qualities measured at the measurement timings and selecting the optimum reception quality, by the mobile station; and reporting the selected optimum reception quality to the first radio base station as the reception quality of the signal sent by the second radio base station, by the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE PREFERRED EMBODIMENTS

Preferred embodiments of the present invention will now be explained with reference to the accompanying drawings.

In one aspect of an embodiment, a mobile station may include: a communication control unit which sets a predetermined period including a synchronizing timing for a first radio base station, in response to an instruction, from the first radio base station forming a cell in which the mobile station exists, for measuring the reception quality of a signal sent by a second radio base station forming a cell with a frequency different from a frequency used in the cell of the first radio base station; a timing setting unit which sets a plurality of measurement timings in a period set by the communication control unit so as to initiate measurement of the reception quality of the signal sent by the radio base station at each of the measurement timings; a reception quality comparing unit which compares the reception qualities measured at the measurement timings set by the timing setting unit and selects the optimum reception quality therefrom; and a control information generating unit which reports the optimum reception quality selected by the reception quality comparing unit to the first radio base station, as the reception quality of the signal sent by the second radio base station.

The reception quality may be measured in a predetermined range based on a reception timing of a serving base station without executing a synchronizing process, and the optimum value is acquired as a measurement result. Thus, the scanning period of the different frequency scanning process may be within a predetermined period, regardless of the situation (e.g., the moving velocity).

Embodiment 1

Explanations will now be made of a reception quality measurement method according to this embodiment. According to the reception quality measurement method of this embodiment, a scanning period may be prevented from being extended in a different frequency scanning process.

Figure 1:
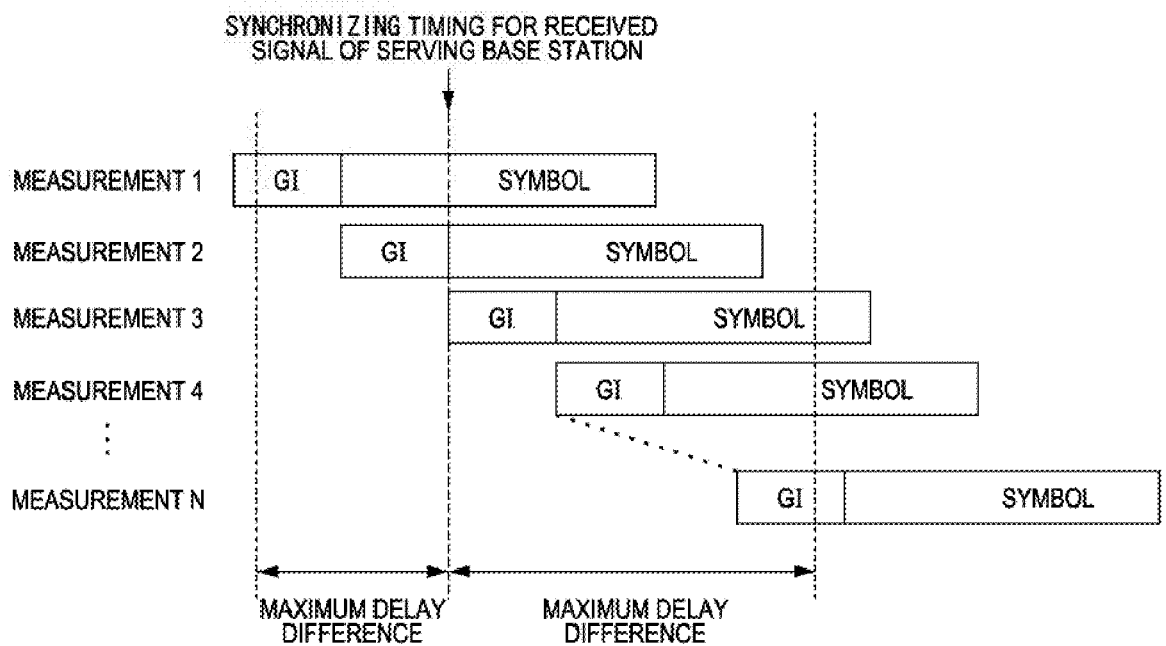
FIG. 1 is a diagram explaining a reception quality measurement method according to embodiment 1.

FIG. 1 is a diagram explaining a reception quality measurement method according to this embodiment. There is a timing difference between two timings: a timing (synchronizing timing (of a received signal)) at which a signal sent from a serving base station is received by a mobile station, and a timing at which a signal sent from a target base station is received by the mobile station. This difference is within a range in which a delay difference in a transmission path is added to the difference of the transmission timings. Thus, the timing at which the signal sent from the target base station is received by the mobile station is somewhere within this range based on the timing at which the signal sent from the serving base station is received by the mobile station.

In general, the transmission timings of radio frames are substantially synthesized between radio base stations that are subject to a handover process, or a delay difference of the transmission timing is defined therebetween. The maximum value of the delay difference in the transmission path may be obtained based on the maximum value of the distance between the mobile station and the target base station. Thus, it is possible to acquire in advance the maximum delay difference. This maximum delay difference represents how much the timing (synchronizing timing), at which the signal sent from a target base station is received by the mobile station, may deviate (before/after) from the timing at which the signal sent from the serving base station is received by the mobile station.

According to the reception quality measurement method according to this embodiment, a plurality of measurement timings are set within the range of the maximum delay difference before or after the timing (synchronizing timing) at which the signal sent from the serving base station is received by the mobile station, thereby measuring the reception quality at each of the set measurement timings. Of the plurality of measurement values, the optimum measurement value is reported to the serving base station as the reception quality of the target base station.

The reception quality is measured based on reference signals sent by respective radio base stations performing OFDM modulation on patterns that differ between the radio base stations. Thus, of the plurality of measurement values, a value measured at a measurement timing that is not the timing for receiving signals from the target base station corresponds to a noise level measurement value derived by executing a correlation process with a reference signal in a frequency region. However, of the plurality of measurement values, a value measured at a measurement timing corresponding to the reception timing adequately represents the reception quality of a signal from the target base station.

The optimum measurement value can be selected if an adequate reception timing is attained in any of the plurality of measurement timings that are set in the range of the maximum delay difference. Then, the optimum measurement value is reported to the serving base station. The reception quality reported at this time adequately represents the reception quality of the signal sent from the target base station.

As explained above, the reception quality is measured several times while changing the position of the FFT window in the range of the maximum delay difference. In this measurement, an adequate reception quality may be obtained if the adequate reception timing occurs at least once. According to this method, there is no need to perform a synchronizing process in advance to adjust the reception timing. This prevents the scanning period from being extended. Even if the mobile station is moving at a high speed, the scanning period may be prevented from being extended. The settings for the scanning period may be simply controlled, thus reducing the measurement time during high-speed movement and improving the system throughput.

To attain the adequate reception timing in any of the plurality of measurements, a measurement timing may be set by shifting the measurement timing by each guard interval (hereinafter referred to as "GI") length of an OFDM signal. This setting is done based on the timing for receiving the signal sent from the serving base station at the mobile station. The GI represents a signal which is obtained by copying a part of an effective symbol, and is sent before or after the symbol.

If the measurement timing (e.g., the head position of the FFT window) is in the GI, the adequate reception timing is attained so as to appropriately demodulate the symbol. Thus, adequate reception quality may be attained at any of the measurements if the reception quality is measured while changing the position of the FFT window by each GI length. The reception quality may be measured while changing the position of the FFT window at each length shorter than the GI length, if there is no concern that the number of measurements increases.

It may be necessary to reduce the scanning period in order to reduce the time required for the different frequency scanning process. In this case, there is no need to measure the quality at all the measurement timings that are set for each GI length in the range of the maximum delay difference. In this case, the measurement is performed from a high priority timing. After the elapse of a previously set scanning period, the optimum measurement value at the time is reported to the serving base station. As a result, adequate reception quality may be reported with high probability.

Figure 2:
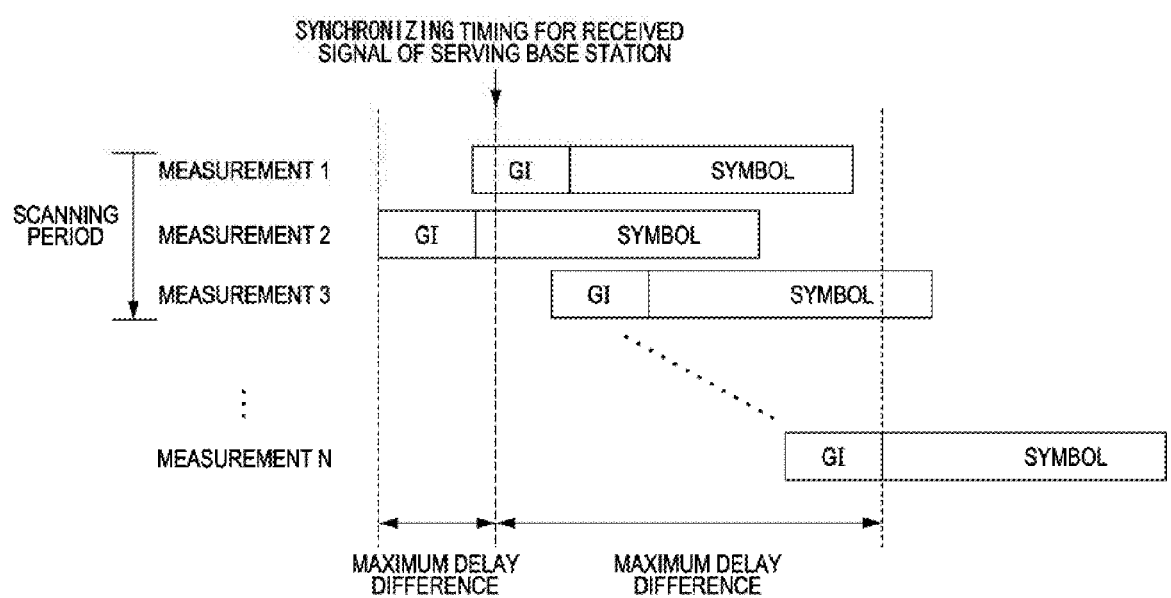
FIG. 2 is a diagram of an example of a measurement order for reception quality.

Explanations will now be made to an example of a method for giving a priority to each timing for measuring the reception quality. According to a first method, a priority is given in the order from a timing that is very close to a timing at which the signal sent from the serving base station is received by the mobile station. FIG. 2 is an example of this method. The reception quality measurement for different frequencies is executed mainly for handover determination and is used for selecting a radio base station having the optimum reception quality. Thus, it can be considered that the optimum value may be obtained at a measurement timing that is closer to the reception timing of the serving base station with higher probability than obtaining the optimum value at a measurement timing further away from the reception timing. With this method, the optimum value may be quickly obtained with high probability.

Figure 3:
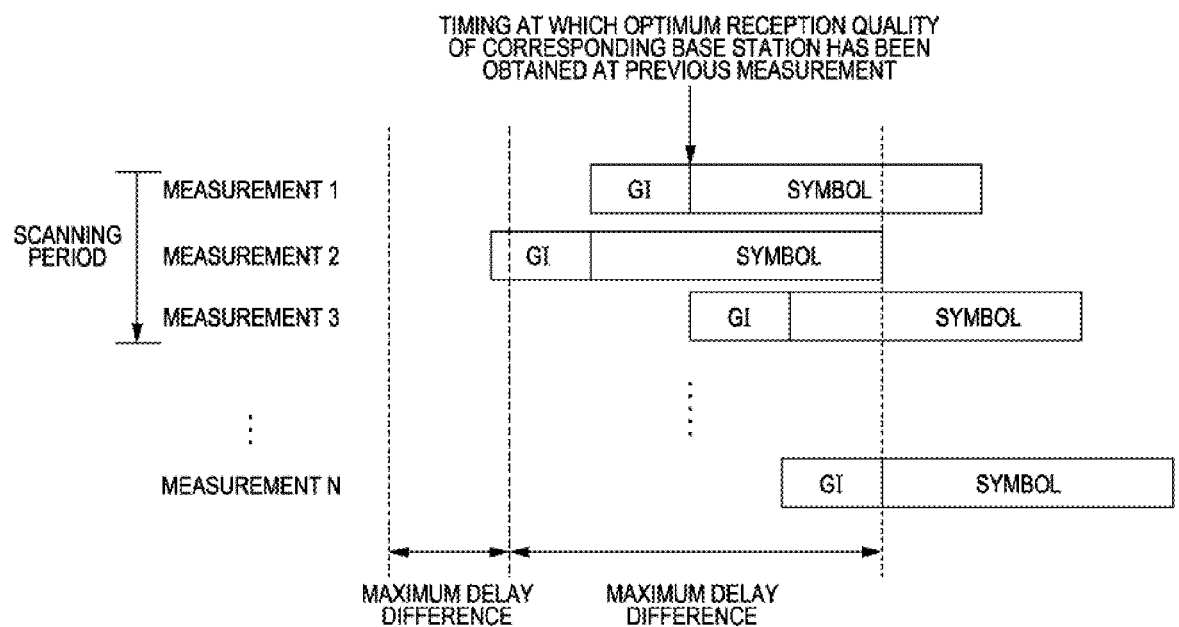
FIG. 3 is a diagram of an example of a measurement order for reception quality, when a measurement result is used.

According to a second method, high priority is given to the measurement timing at which the optimum value has been obtained when the previous reception quality is measured at the target base station. FIG. 3 is an example of this method. When a mobile station approaches a cell end, the mobile station begins monitoring the reception quality of the surrounding cells in the direction of movement in response to a request for different frequency scanning. Then, the mobile station executes a handover process at an adequate timing. Thus, in many cases, the reception quality is measured periodically at specific intervals until the handover process is executed. The measurement timing at which the previous optimum value has been obtained is stored, and the reception quality is measured first at the stored measurement timing at the time of the next measurement. This results in obtaining the optimum value at this timing with high probability. The priority may be given to the second and subsequent measurement timings in this method, in the order from the measurement timing closest to the measurement timing at which the previous optimum value has been obtained, or the first method may be applied.

Figure 4:
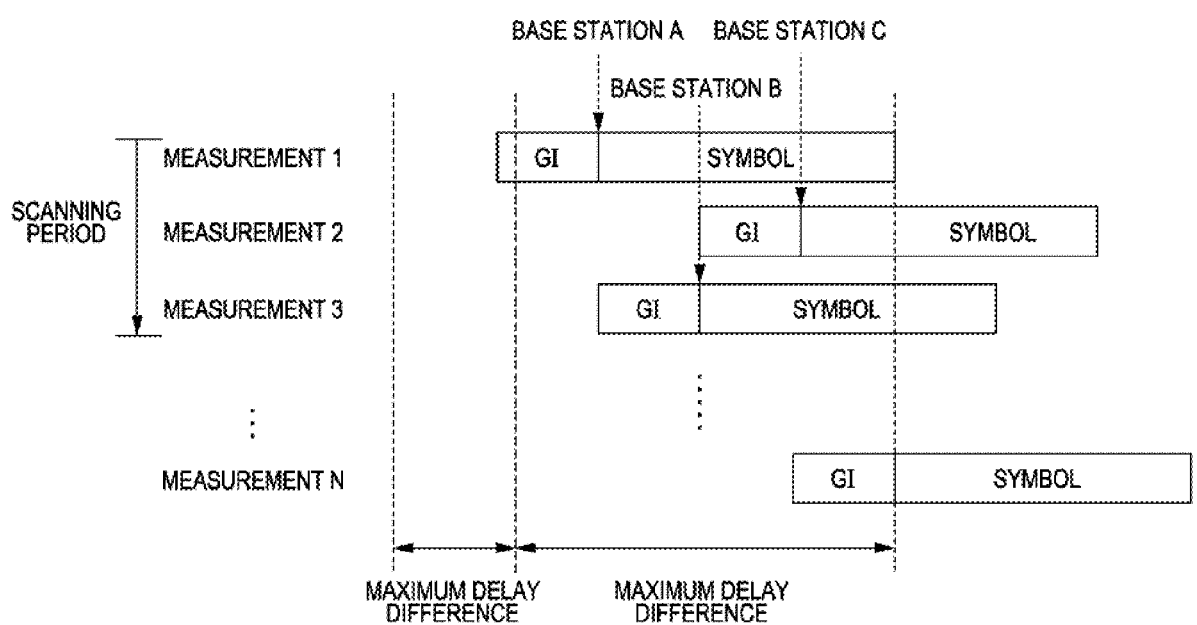
FIG. 4 is a diagram of an example of a measurement order for reception quality, when a plurality of measurement results are used.

A third method is improved from the second method so as to correspond to a case where there may be a plurality of target base stations. FIG. 4 is an example of this method. A plurality of target base stations may exist when the mobile station approaches the boundary between surrounding cells. In this case, each target base station stores the measurement timing at which the optimum value has been obtained at previous measurements, and stores also the reception quality. When each of the target base stations is specified as a target base station to be measured, the priority is given to a measurement timing at which the corresponding reception quality has been measured in descending order of reception quality obtained at previous measurements. The priority is thus set, thereby quickly obtaining the optimum value with high probability even if there are a plurality of target base stations. FIG. 4 is an example where the previously measured optimum values are obtained in descending order from the radio base station A, the radio base station B, and the radio base station C.

In the above-described third method, the evaluation values of the previously measured optimum values of each of the stations are added together at each measurement timing at which the optimum value is obtained. Subsequently, the priority of the measurement timing may be determined based on the total value. For example, for the radio base station A, the evaluated optimum value corresponding to the reception quality of "10" is measured at measurement timing T1 in the previous measurement. For the radio base stations B and C, the evaluated optimum values corresponding to the reception quality of "8" and "6" are both measured at the measurement timing T2. In this case, the evaluated value of the measurement timing T2 is "14" (the sum of 8 and 6) and is larger than the evaluated value of "10" at the measurement timing T1. Higher priority is given to the measurement timing T2 than to the measurement timing T1 at which the optimum value has been measured. The priority is thus set. This results in measuring the optimum values of the plurality of stations at one measurement with a high possibility, and also quickly acquiring the optimum values with a high possibility. At each measurement timing, the total number of stations corresponding to the previously measured optimum value at the same measurement timing is calculated. In addition, the priority may be given to the measurement timings in the order of the largest total number. Also in this way, the same effect may be attained.

The maximum delay difference used for determining the period of reception quality measurement may be set in advance in the mobile stations, or may be sent by the serving base station. The case where the maximum delay difference is sent by the serving base station to the mobile station will now be explained.

Figure 5:
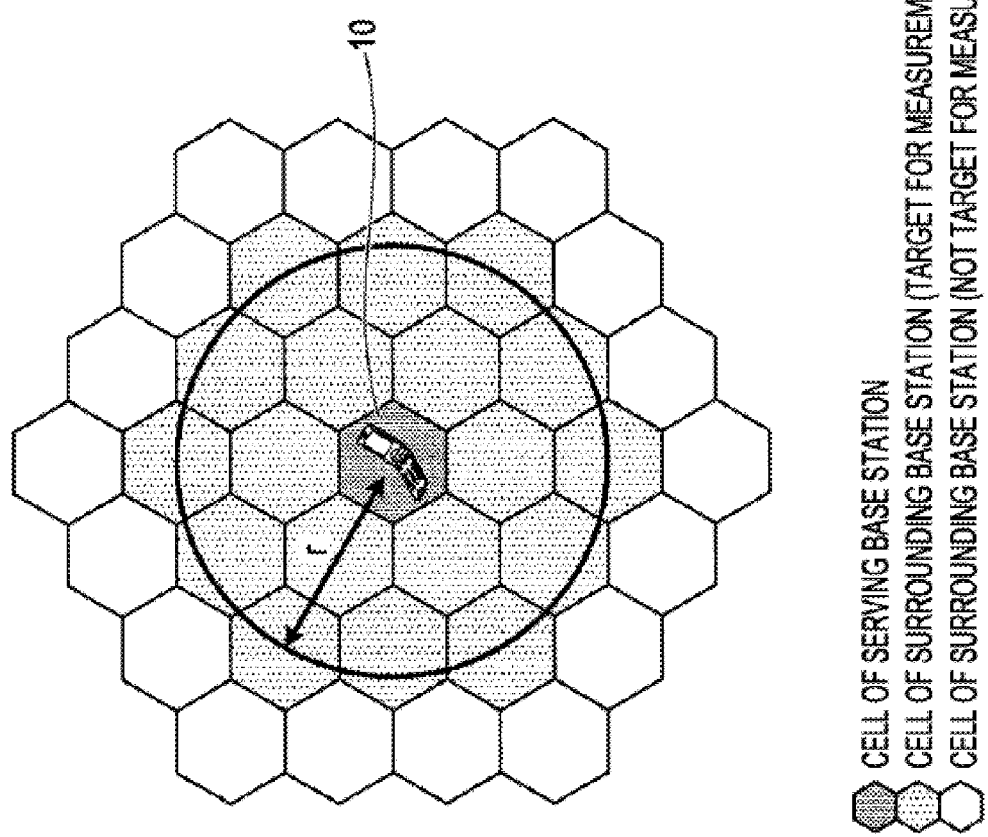
FIG. 5 is a diagram explaining information regarding a maximum delay difference, sent from a serving base station.

FIG. 5 is a diagram explaining information regarding the maximum delay difference sent from the serving base station. In FIG. 5, each hexagon represents one cell that is provided by a radio base station. The central cell is the cell of the serving base station. It is understood that a target radio base station that can be measured is limited to the range of the distance "r", based on cell locating conditions, geographical conditions, transmission power specifications, etc.

In this case, the central serving base station sends information including the maximum delay difference corresponding to the distance "r" and a transmission timing difference based on a standard or specification. Upon reception of an instruction for different frequency scanning, a mobile station 10 sets the maximum delay time, and measures reception quality based on the received information.

Explanations will now be made regarding a configuration of a mobile station and a radio base station according to this embodiment. The above-explained constituent parts are identified by the same reference numerals, and thus will not be explained again.

Figure 6:
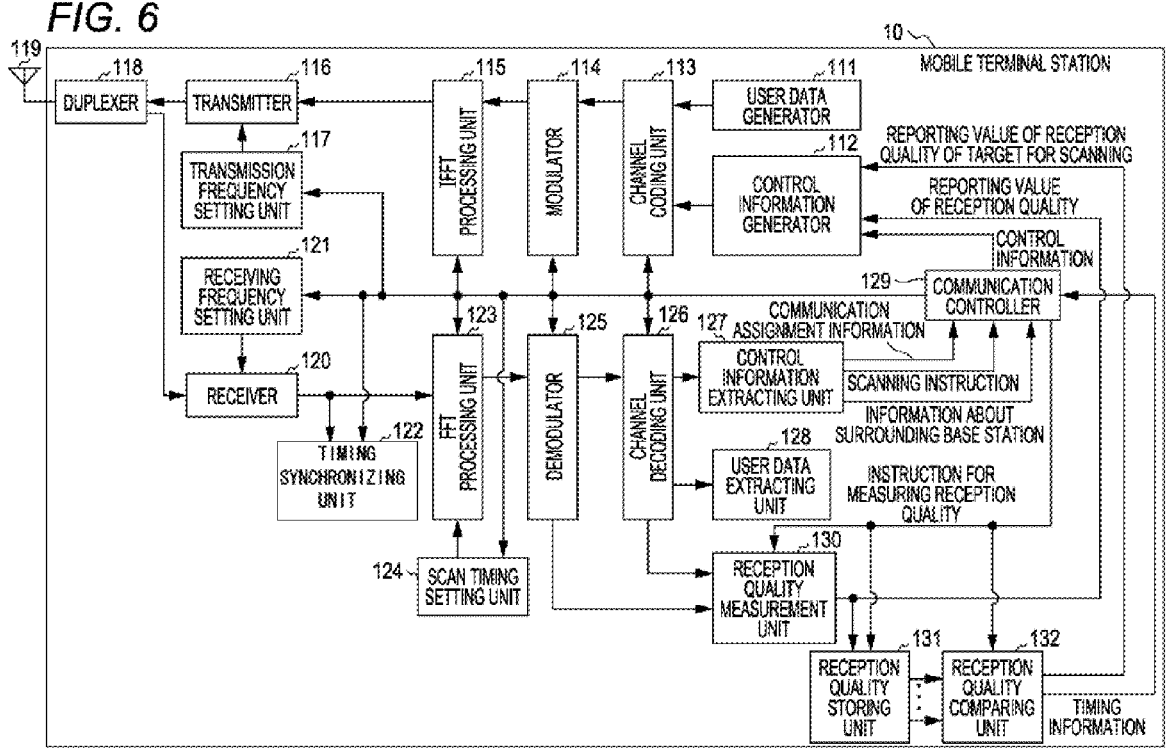
FIG. 6 is an example of a configuration of a mobile station according to embodiment 1.

FIG. 6 is an example of a configuration of the mobile station 10 in this embodiment. In FIG. 6, an OFDM communication system is applied both to communication from the radio base station to the mobile station (forward link communication) and also to communication from the mobile station to the radio base station (reverse link communication). However, the reverse link communication is not limited to the OFDM communication system, and may use another communication system such as a single carrier communication system.

Explanations will now be made of the constituent elements of FIG. 6. A user data generator 111 generates traffic data corresponding to the communications intended by a user. A control information generator 112 generates control information to be sent to a communication target. A channel coding unit 113 executes an error correction encoding/interleaving process in combination with the traffic data and the control information. A modulator 114 executes a bit repeating process for the encoded data, inserts a known pilot signal/preamble signal, and executes a QPSK or QAM modulation process. Then, the modulator 114 assigns signals to each sub carrier symbol of the OFDM.

An IFFT processing unit 115 executes an IFFT process for the symbol assigned to the sub carrier so as to convert the symbol into a time waveform. In this configuration, the IFFT processing unit 115 also executes a GI insertion process. A transmitter 116 includes a D/A converter, a mixer, a transmission power amplifier, a filter, etc. The transmitter executes a frequency conversion process, an amplification process, and a waveform formation process. The transmitter also up-converts a digital base-band signal into a transmission RF signal. A transmission frequency-setting unit 117 sets, for the transmitter 116, a local frequency corresponding to up-conversion into an RF frequency for transmission.

A duplexer 118 uses an antenna of terminal for transmitting and receiving radio signals 119 for transmission and reception, and thus switches between transmission signals and reception signals by frequency or time. The transmission RF signal transmitted through the duplexer 118 is transmitted from the antenna of terminal for transmitting and receiving radio signals 119.

The signal received by the antenna of terminal for transmitting and receiving radio signals 119 is separated from a transmission signal by the duplexer 118, and is input to a receiver 120. The receiver 120 includes a band limit filter, a reception low noise amplifier, an orthogonal demodulator, an AGC amplifier, an A/D converter, etc., and converts the received RF signal into a digital base-band signal. A receiving frequency setting unit 121 sets a frequency for the receiver 120.

A timing synchronizing unit 122 detects a wireless frame timing of a received signal, and detects a symbol synchronizing timing. The timing synchronizing unit 122 informs an FFT processing unit 123 of an FFT window start timing. The FFT processing unit 123 sets an FFT window at a specified timing, executes an FFT process for an input sample string, and converts the signal into a received sub-carrier symbol of a frequency region. A scan timing setting unit 124 informs the FFT processing unit 123 of the FFT window start timing in the scanning process.

A demodulator 125 executes a transmission path estimation process/demodulation process from the known pilot inserted into the sub-carrier, so as to extract a received encoded symbol string. A channel decoding unit 126 executes a decoding and error correction and detection process, corresponding to the encoding process executed at the transmission, so as to extract a received data string. A control information extraction unit 127 extracts control information necessary for communication control, from the received data, and sends the information to a communication controller 129. A user data extracting unit 128 extracts necessary data corresponding to the communication purpose of a user from the received data string.

The communication controller 129 controls operations of each unit in response to an instruction from the upper layer function and the control information extracted from the received data. A reception quality measurement unit 130 measures the quality of a received signal (RSSI, CINR, etc.) based on the known signal (pilot, preamble, etc.) detected by the demodulator, and provides the control information generator 112 with the measurement result. A reception quality storing unit 131 stores reception qualities that are measured at a plurality of timings during different frequency scanning. A reception quality comparing unit 132 compares a plurality of reception qualities that are stored in the reception quality storing unit 131, and provides the control information generator 112 with the optimum value as a reporting value.

Figure 7:
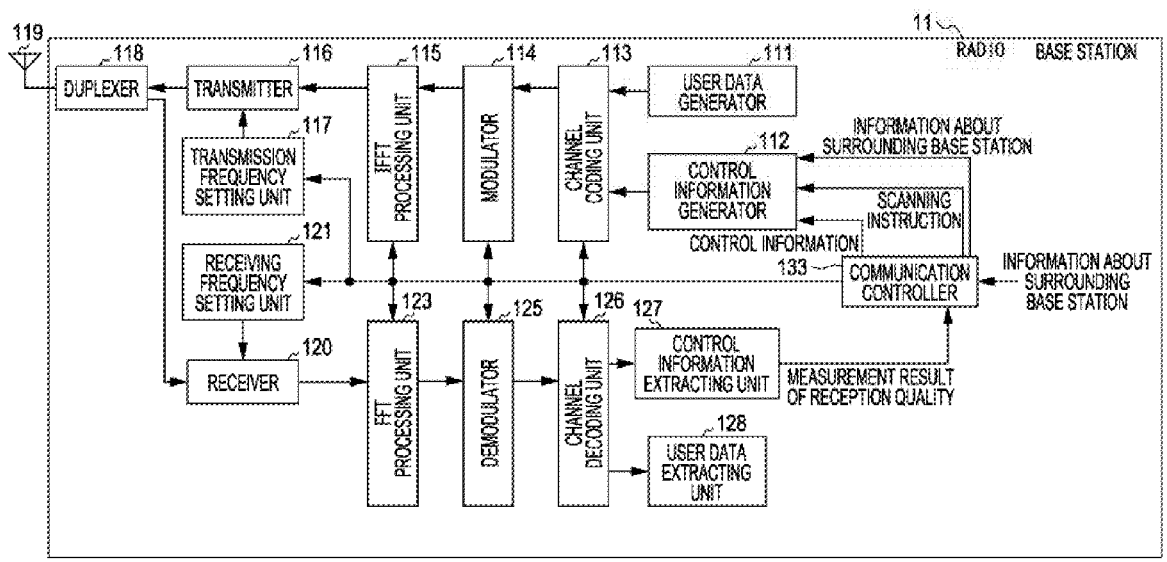
FIG. 7 is an example of a configuration of a radio base station according to embodiment 1.

FIG. 7 is an example of a configuration of a radio base station 11 of this embodiment. As illustrated in FIG. 7, the radio base station 11 includes the user data generator 111, the control information generator 112, the channel coding unit 113, the modulator 114, the IFFT processing unit 115, the transmitter 116, the transmission frequency setting unit 117, the duplexer 118, the antenna of terminal for transmitting and receiving radio signals 119, the receiver 120, the receiving frequency setting unit 121, the FFT processing unit 123, the demodulator 125, the channel decoding unit 126, the control information extracting unit 127, the user data extracting unit 128, and a communication controller 133.

The communication controller 133 controls operations of each unit. For example, when a surrounding radio base station of the mobile station approaching the cell terminal forms cells of different frequencies, the communication controller 133 instructs the control information generator 112 to send an instruction for executing a different frequency scanning process to the mobile station.

Explanations will now be made about a different frequency scanning operation in this embodiment. When it is determined that the different frequency scanning is to be executed at a particular mobile station, the serving base station having the configuration of FIG. 7 generates control information for instructing the corresponding mobile station to perform the different frequency scanning. This determination is made by the communication controller 133, based on the quality of a received signal through the reverse link communication from the mobile station, a quality measurement value of a received signal through the forward link communication at the mobile station, a handover request from the mobile station, and information regarding surrounding radio base stations from the upper layer.

For example, deterioration may occur in the reception quality reporting value of the forward link communication that is reported from the mobile station. In addition, a radio base station of a frequency different from that of the serving base station may be operating in an adjacent cell according to the information regarding the surrounding radio base station from the upper layer, such as a wireless control station. In this case, an instruction for executing different frequency scanning is sent to the corresponding mobile station in order to determine whether a handover process may be executed at the radio base station. The different frequency scanning instruction generated by the communication controller of the serving base station specifies a scanning period, a starting time, a repetition cycle, and information regarding a target radio base station to be scanned. This specification is sent to the mobile station through the forward link communication as control information.

Figure 8:
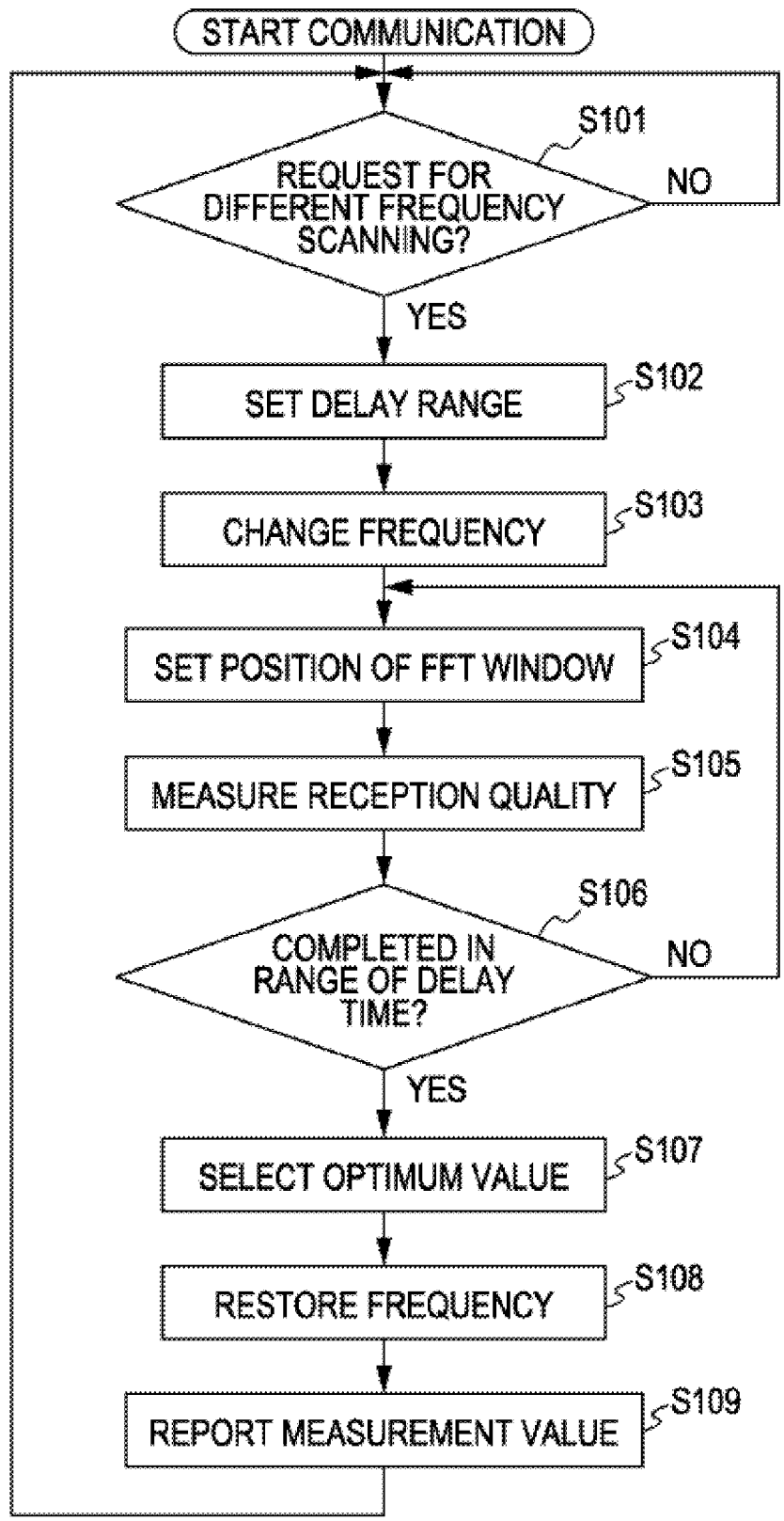
FIG. 8 is an example of a procedure of a different frequency scanning process of the mobile station according to embodiment 1.

The mobile station receives the forward link communication, extracts the control information, and transmits an instruction for different frequency scanning to the communication controller 129. As illustrated in FIG. 8, upon reception of a request for different frequency scanning (YES in step S101), the communication controller 129 sets the maximum delay time difference before and after the reception timing of the forward link communication with the serving base station based on a value set using the radius of the service cell or the maximum transmission power, or based on a value included in the control information sent from the radio base station. In addition, the communication controller 129 sets the range of reception quality measurement of cells of different frequencies, the number of times the measurement is performed, and the FFT timing at each measurement (Step S102).

The mobile station begins measuring the reception quality of different frequencies at the times instructed in the scanning instruction. The communication controller 129 instructs the receiving frequency setting unit 121 to change the frequency to a frequency of a target to be measured, so as to change the reception frequency of the receiver 120 (step S103). In response to an instruction to the scan timing setting unit 124, the communication controller 129 sets the FFT timing at the timing for measuring the reception quality (Step S104). The order of setting the measurement timing is set in accordance with any one of the three methods in FIGS. 2 to 4.

The reception quality measurement unit 130 measures the reception quality based on an FFT result of a received signal at the set timing, and stores the measured reception quality in the reception quality storing unit 131 with timing information. Different patterns (preamble signals or the like) are sent from surrounding radio base stations using the same frequency, in order to distinguishably measure quality of a signal to be received from each radio base station. Information for identifying a target pattern to be measured is included both in information regarding surrounding radio base stations sent as reporting information and a scanning instruction. When there are a plurality of target cells to be measured, the above information is used to perform the same measurements for each target cell (Step S105).

Such measurements are repeated in the set range of measurement time. When the measurements are completed for each of the target cells to be measured (YES in step S106), the reception quality comparing unit 132 selects the optimum value from the reception quality stored in the reception quality storing unit 131, and sends the selected value to the control information generator 112 as a reporting value. Information representing the timing at which the optimum value has been acquired is sent to the communication controller 129 and is used as information representing the timing to start the next measurement for the target radio base station to be measured.

When the three methods in FIGS. 2 to 4 are used, the mobile station executes a process for changing the frequency in order to start communication with the serving base station when the scanning period is about to end before ending the reception quality measurement at all the set measurement timings. If other measurements cannot be performed in order to execute the above process, the reception quality comparing unit 132 selects the optimum value from the storage values representing the measured reception qualities, and sends the selected value to the control information generator 112 as a reporting value (Step S107).

After the reception frequency of the receiver 120 is restored to its original value (Step S108) in response to an instruction of the communication controller 129, the reception quality reporting value of each cell specified by the control information generator 112 is modulated, IFFT-processed, and up-converted. Then, the processed value is sent to the serving base station through reverse link communication (Step S109).

As described above, by using the reception quality measurement method according to this embodiment, the reception quality of the cells of different frequencies may be measured in the form where the scanning period may easily be set in the different frequency scanning process. Further, the efficiency of the normal communication at the corresponding mobile station may be improved.

Embodiment 2

According to the reception quality measurement method according to embodiment 1, when an RSSI (Received Signal Strength Indicator) or the like based on the reception power is used as reception quality, a timing difference of equal to or less than the GI length remains at the FFT timing. This timing difference has no effect on the measurement result because the power for measuring the symbol is substantially used.

However, when a CINR or the like is used in consideration of an interference wave, as reception quality, a large measurement error may occur due to a phase rotation in a frequency region as a result of the timing error of the GI length or less, depending on the calculation method.

Figure 9:
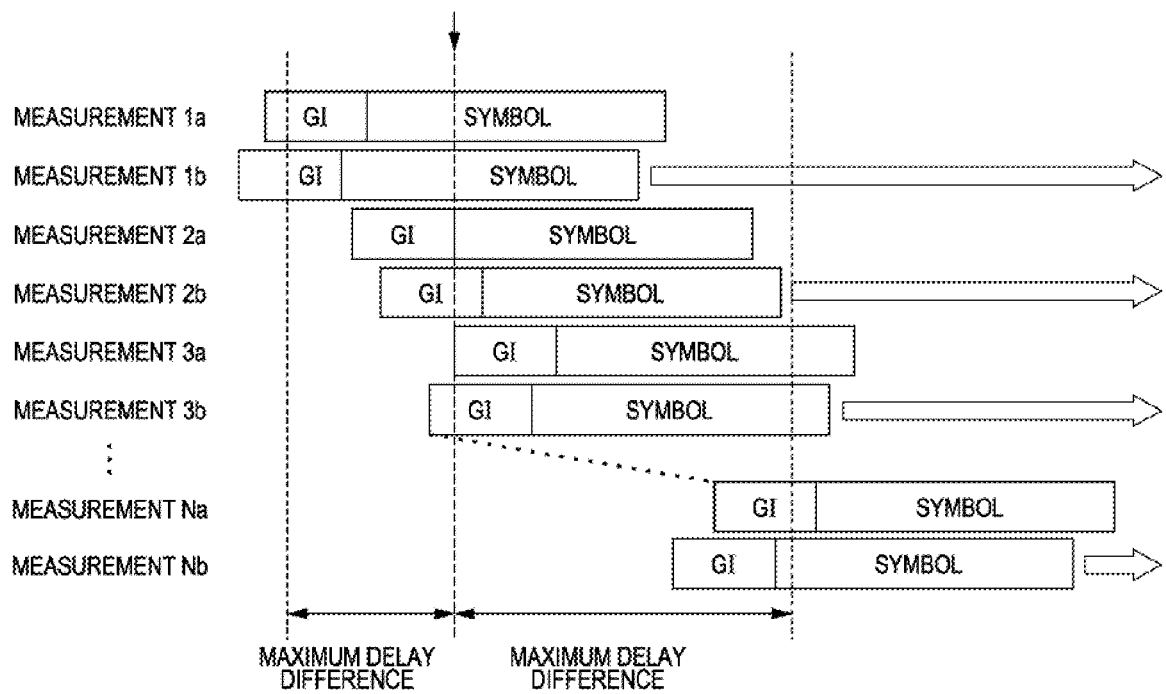
FIG. 9 is a diagram of a reception quality measurement method according to embodiment 2.

In this case, as illustrated in FIG. 9, the measurement at timing "1" may be divided into two steps, thereby improving the accuracy of the reception quality to be measured. At a first step, one measurement timing is set in accordance with the same procedure as embodiment 1, and an amount of the phase rotation of a reference signal after being FFT-processed is calculated. Subsequently, at a second step, a process for adjusting the amount of phase rotation (also called "timing recovery") is executed, thereafter measuring the reception quality of the CINR and the like.

This process is repeated several times at each timing shift of the GI length. The measurement results of the reception quality at each measurement are compared with each other, and the optimum value is set as the final reception quality reporting value. In the above-described timing recovery process, at the measurement in which the reception timing of a signal to be transmitted by a target base station is not in the GI length, a symbol of a reference signal is not in the FFT window. Thus, the calculated value of the amount of phase rotation may not be an accurate value and an unnecessary recovery process may be conducted. At the measurement in which the reception timing may be in the GI length, the amount of phase rotation of a reference signal may be accurately calculated. The amount of phase rotation corresponding thereto is adjusted so as to improve the accuracy of the reception quality measurement.

By using this method, even when measuring the reception quality with some effect from a timing deviation within the GI length, the time required for the different frequency scanning may be specified. However, according to this method, the number of times the reception quality is measured is twice the number of the case in embodiment 1. As a result, the measurement at all the timings may not be completed in the scanning period.

Figure 10:
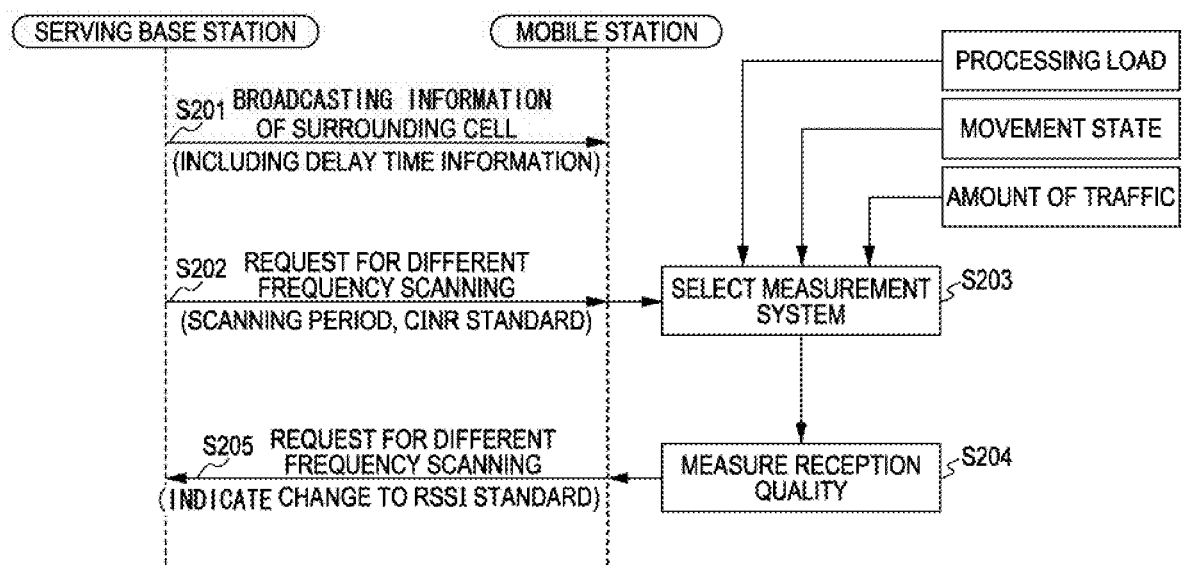
FIG. 10 is a diagram explaining a change for and information regarding the measurement system.

To solve this problem, as illustrated in FIG. 10, when the measurements at all the timings within the scanning period may not be completed, the different frequency scanning process may be executed using the method of embodiment 1, using the RSSI or the like based on the reception power as reception quality.

Explanations will now specifically be made with reference to FIG. 10. The serving base station sends information regarding a target surrounding radio base station for a handover process to the mobile station in the cell as reporting information (Step S201). This reporting information includes the information regarding the maximum delay time in relation to the target base station. The serving base station sends a request for different frequency scanning to the mobile station (Step S202). The request may include a scanning period and an instruction for performing reception quality measurement with reference to a CINR.

In this case, the mobile station estimates the time required for measuring the reception quality in two steps at each timing based on the movement state of the present mobile station, the state of the internal processing load, and the estimated amount of traffic. Then, the station compares the estimated time with the scanning period. When it is necessary to reduce the measurement requirement time, the mobile station selects an RSSI whose accuracy is not deteriorated by the timing deviation in the GI length as a measurement standard (Step S203), and measures the reception quality using the method explained in embodiment 1 (Step S204). The mobile station reports the measurement standard and the measurement value to the serving base station (Step S205).

Figure 11:
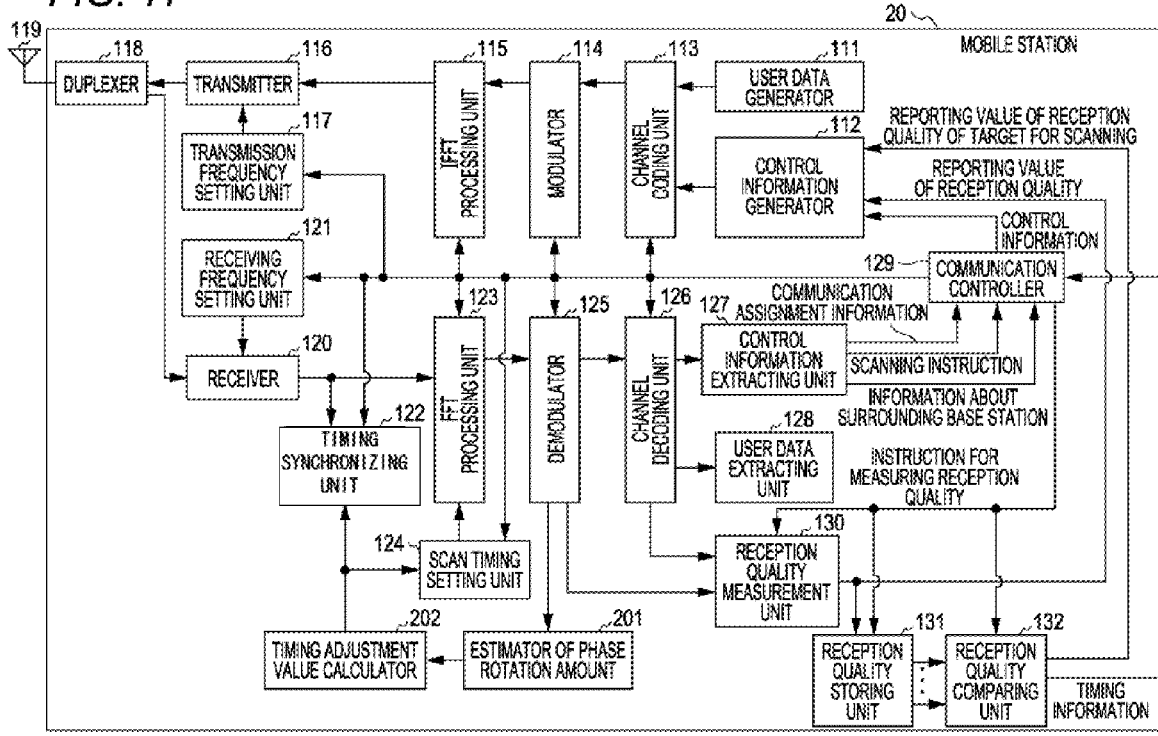
FIG. 11 is an example of a configuration of a mobile station according to embodiment 2.

An explanation will now be made about a configuration of a mobile station 20 according to this embodiment. FIG. 11 is an example of the configuration of the mobile station according to this embodiment. As illustrated in FIG. 11, the mobile station 20 has an estimator of phase rotation amount 201 and a timing adjustment value calculator 202, in addition to the configuration of the mobile station 10 illustrated in FIG. 6.

The estimator of phase rotation amount 201 calculates the amount of phase rotation originating from the FFT timing deviation, based on the FFT result of the forward link received signal acquired from the demodulator 125 and the pattern of each sub-carrier of the reference signal corresponding to the target radio base station to be measured. When the different frequency scanning instruction specifies a reception quality standard in which the measurement value is affected by the FFT timing deviation, the FFT timing deviation is adjusted based on the amount of phase rotation.

For this purpose, two configurations are used. One of the configurations is to rotate the phase at each sub-carrier in the frequency region so as to cancel the amount of phase rotation, while the other configuration is to calculate the timing deviation based on the amount of phase rotation of the frequency region so as to adjust the FFT timing in the time region. The former configuration requires the phase rotation process at each sub-carrier, while the latter configuration may be formed in a small circuit scale because only one FFT timing adjustment is conducted. In the latter configuration the FFT timing is adjusted so as to execute the FFT again, resulting in a delay. In this embodiment, the latter configuration is applied. However, the former configuration may also be applied.

The timing adjustment value calculator 202 calculates a timing adjustment value based on the amount of phase rotation so as to adjust the FFT timing of the scan timing setting unit. The time necessary for measuring the reception quality is extended due to a delay. This delay increases as a result of the estimation of the amount of phase rotation, calculation of the timing adjustment value, and re-execution of the FFT, in the second step. The communication controller 129 determines that the measurement does not end in the scanning period in consideration of the specified scanning period and the time necessary for the measurement. At this time, the communication controller 129 shifts to a reception quality measurement method wherein the above-described process is not necessary, and sends the measurement result and information representing a change in the reception quality measurement standard to the serving base station as control information.

An explanation will now be made about an execution procedure of a different frequency scanning process that is executed by the mobile station 20 according to this embodiment. The different frequency scanning instruction specifies the reception quality standard in which the measurement value is affected by the FFT timing deviation, and it is determined that the measurement is completed in the scanning period.

Figure 12:
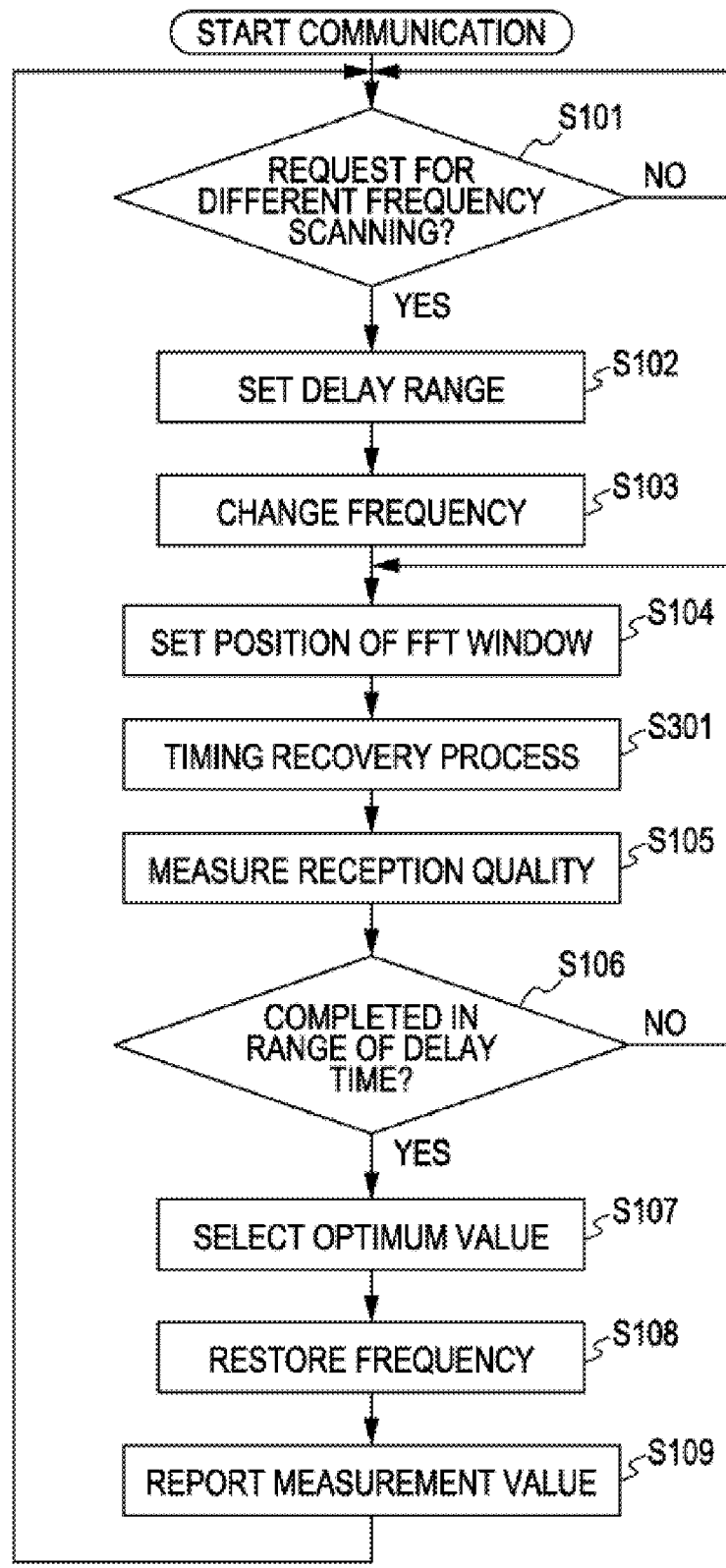
FIG. 12 is a flowchart of a procedure of a different frequency scanning process of the mobile station according to embodiment 2.

FIG. 12 is a flowchart regarding a procedure of the different frequency scanning process executed by the mobile station 20 according to this embodiment. As illustrated in FIG. 12, in the procedure, step S301 is added between step S104 and step S105 in the procedure illustrated in FIG. 8. The procedure of step S301 corresponds to the processes of the estimator of phase rotation amount 201 and the timing adjustment value calculator 202.

As described above, by using the reception quality measurement method according to this embodiment, the reception quality of the different frequency cells may be measured in a way that allows for easily determining the scanning period in the different frequency scanning period, thus improving the efficiency of the normal communication of the mobile station. This effect may be attained even when the reception quality standard is one in which the measurement value is affected when a deviation occurs in the GI length of the FFT timing.

Embodiment 3

In embodiments 1 and 2, the explanations have been made about the examples for executing the different frequency scanning process without executing a time synchronizing process. However, the scanning period may be shortened by executing the different frequency scanning process after executing the time synchronizing process, when the mobile station is moved at low speed, like in a conventional method. In this embodiment, an explanation will be made about an example for executing a conventional different frequency scanning process, depending on some conditions such as the movement speed or the like.

Figure 13:
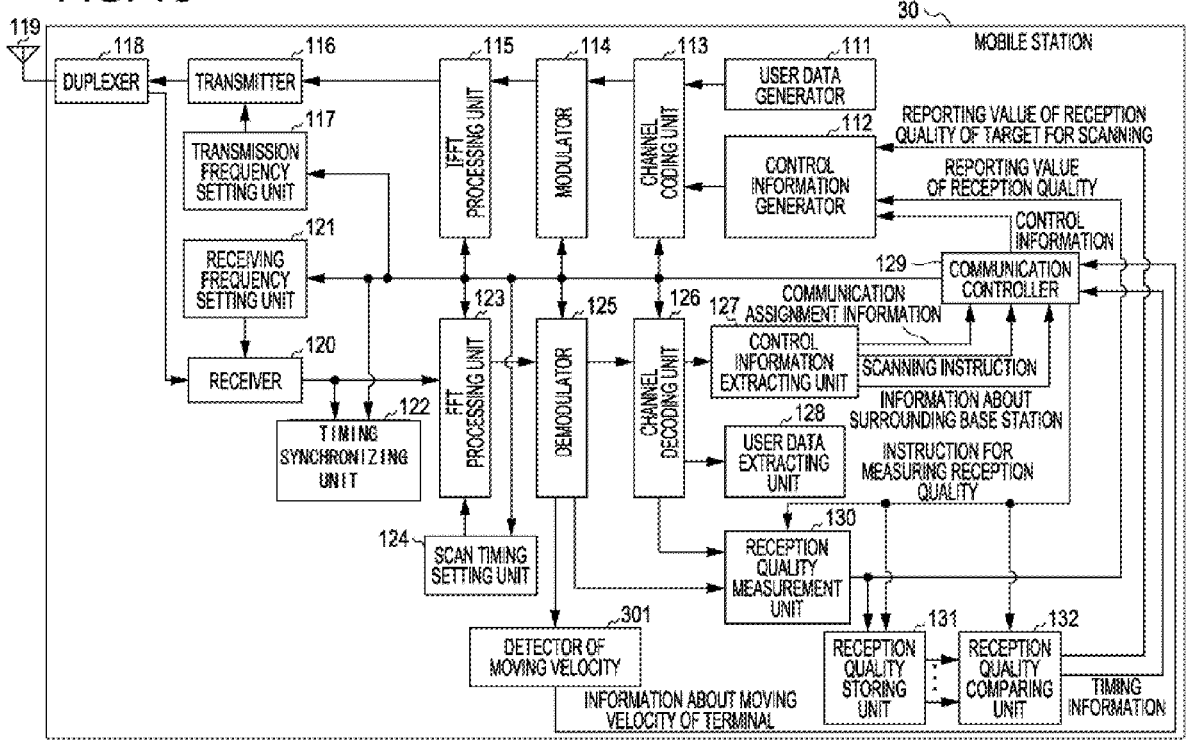
FIG. 13 is an example of a configuration of a mobile station according to embodiment 3.

An explanation will now be made about a configuration of a mobile station 30 according to this embodiment 3. FIG. 13 is an example of a configuration of a mobile station according to this embodiment. As illustrated in FIG. 13, the mobile station 30 has a detector of moving velocity 301 in addition to the configuration of the mobile station 10 illustrated in FIG. 6.

The detector of moving velocity 301 estimates the movement speed of the mobile station 30 and informs the communication controller 129 of the movement speed. Methods for estimating the movement speed include a method for estimating the Doppler spread based on a reference signal included in a received signal, and a method for acquiring speed information from a speed sensor of a vehicle in which the mobile station 30 is installed.

Upon reception of an instruction for different frequency scanning, the communication controller 129 selects a suitable method for acquiring a measurement result of reception quality in a scanning period based on the movement speed informed from the detector of moving velocity 301, a required synchronizing time of the timing synchronizing unit 122, a delay time range and reception quality standard for the reception quality measurement, and the number of cells for measurement.

Figure 19:
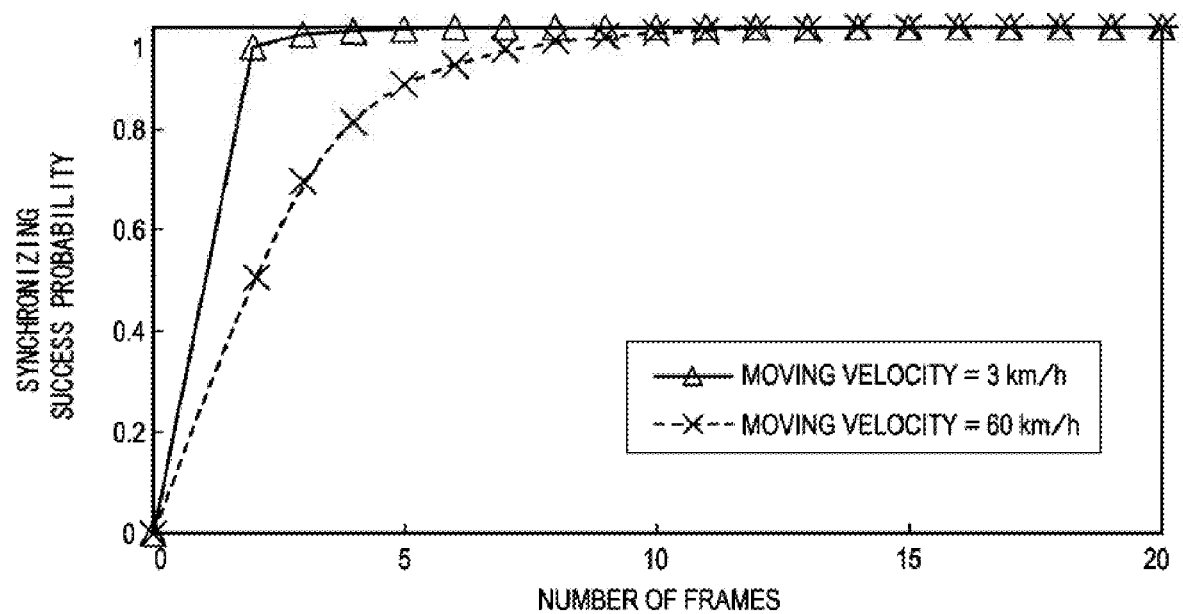
FIG. 19 is a diagram of a simulation result of the total required time for a timing synchronizing process.

For example, the performance of the timing synchronizing unit 122 of the mobile station 30 is described in FIG. 19. In addition, one wireless frame period is required for measuring the reception quality after the timing synchronizing. If the number of times the measurement is performed in the range of the maximum delay difference is ten, each measurement needs one wireless frame, and the process of the reception quality comparing unit 132 takes one wireless frame. In this case, according to the method without the timing synchronizing, the scanning process ends in an eleven wireless frame period. On the contrary, according to the method with the timing synchronizing, because the synchronizing success probability is preferably 100%, the scanning process takes seven wireless frames at most when the movement speed is 3 km/h. When the movement speed is 60 km/h, the scanning process takes sixteen wireless frames at most.

Under the above conditions, the communication controller 129 acquires the amount of an internal processing load of the mobile station 30, and uses a method without the timing synchronizing at the different frequency scanning. In this case, the processing amount increases more than the processing amount of the case performing the timing synchronizing. Thus, the scanning period takes twenty wireless frames, and the movement speed is 60 km/h. At this time, the scanning period may be satisfied according to either of the methods. However, the communication controller 129 selects the method without the scanning synchronizing because the scanning process ends in a shorter period as long as the amount of the internal processing load is equal to or lower than a specific value. If the amount of internal processing load is larger than a specific value, the communication controller 129 executes only a small processing amount, and thus adopts the method with the timing synchronizing.

When a reduction of the scanning period takes precedence over a reduction of the amount of the internal processing load, the scanning period takes fifteen wireless frames, and the movement speed is 60 km/h, for example. In this case, even if the amount of the internal processing load is greater than a specific value, the communication controller 129 adopts the method without the timing synchronizing, because the scanning process ends in a shorter period of time.

Figure 14:
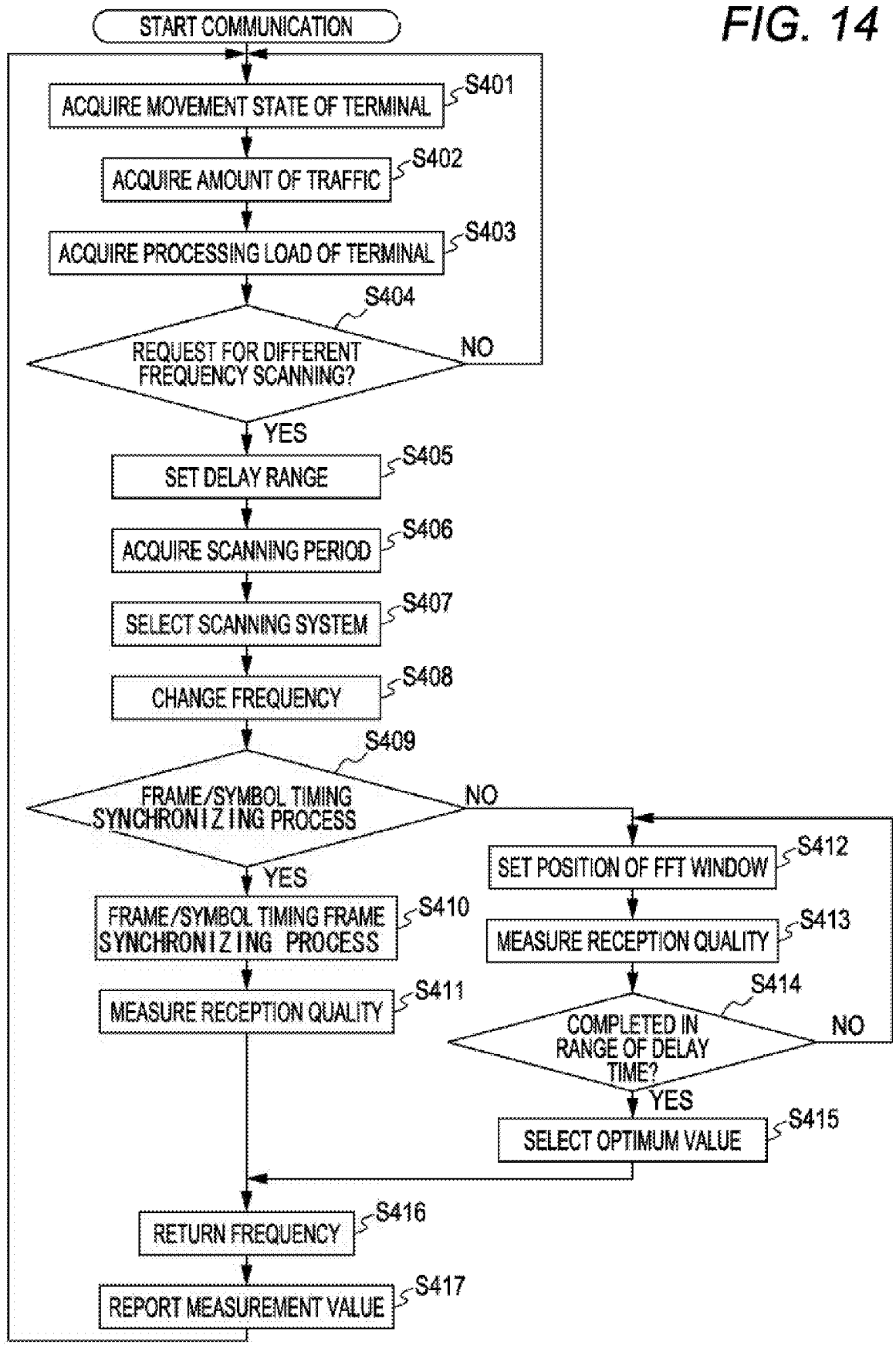
FIG. 14 is a flowchart of a procedure of a different frequency scanning process of the mobile station according to embodiment 3.
Figure 15:
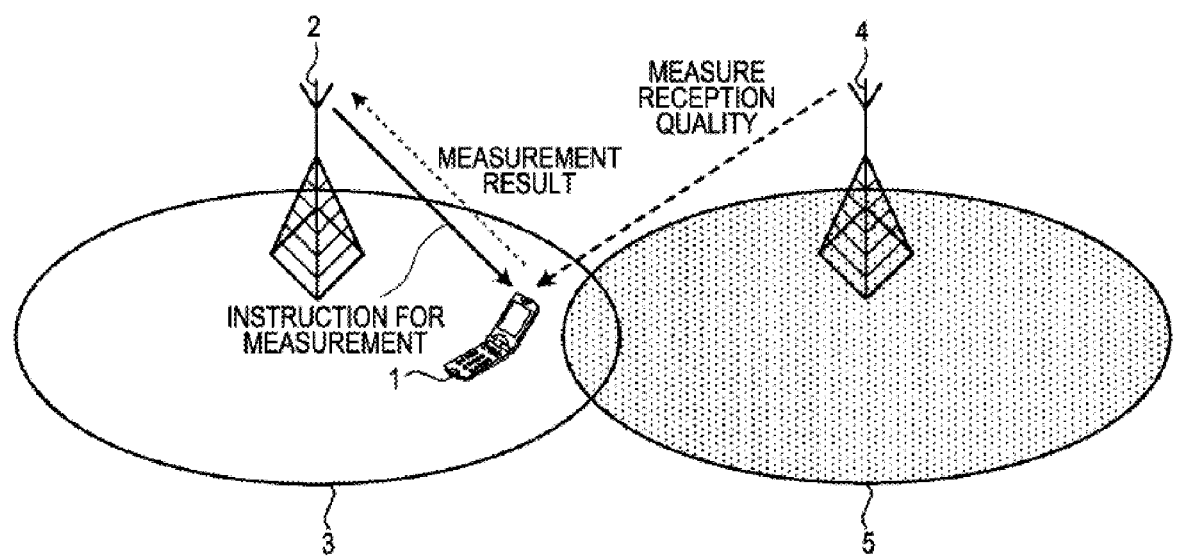
FIG. 15 is an example of a wireless communication system.
Figure 16:
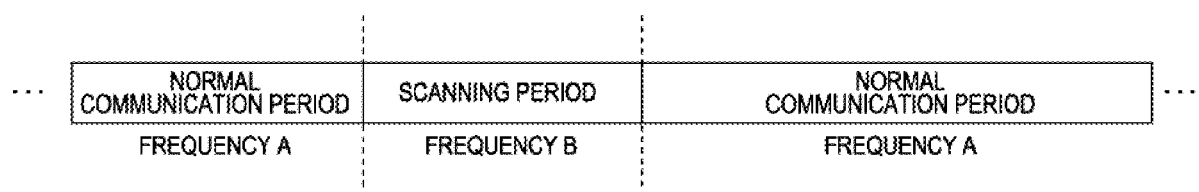
FIG. 16 is a diagram of a communication state before and after a different frequency scanning process.
Figure 17:
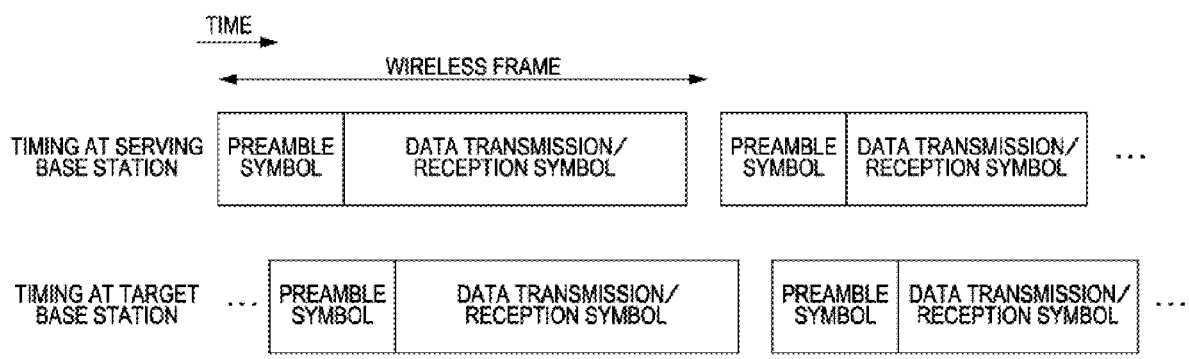
FIG. 17 is an example of a wireless frame.
Figure 18:
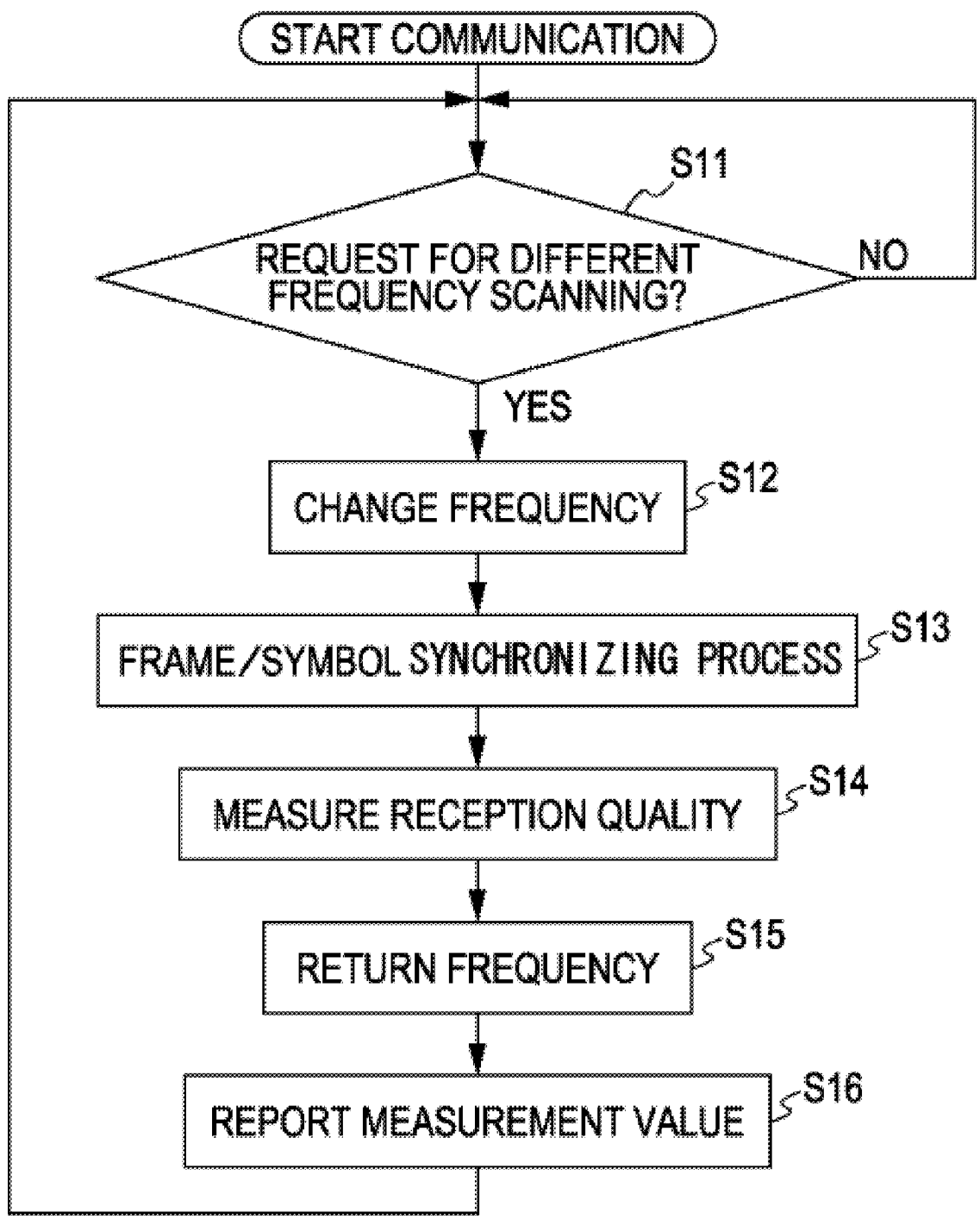
FIG. 18 is a flowchart of a procedure of a conventional different frequency scanning process.

An explanation will now be made about a procedure of a different frequency scanning process executed by the mobile station 30 according to this embodiment. FIG. 14 is a flowchart of a procedure of a different frequency scanning process of the mobile station 30 according to this embodiment.

As illustrated in FIG. 14, the mobile station 30 acquires the movement state of the terminal (e.g., its movement speed, etc.) (Step S401), acquires the traffic amount (Step S402), and acquires the processing load of the terminal (Step S403), until an instruction for different frequency scanning is received (No in step S404).

Upon reception of the instruction for a different frequency scanning (Yes in step S404), the mobile station 30 sets the delay range (Step S405), acquires the specified scanning period (Step S406), and selects either the method with the timing synchronizing or the method without the timing synchronizing based on the information acquired in steps S401 to S403, the scanning period acquired in step S406, and previously-set information (Step S407). The mobile station 30 shifts a frequency for transmission and reception to a frequency of a target base station (step S408).

Upon selection of the method with the timing synchronizing in step S407 (Yes in Step S409), the mobile station 30 executes a frame/symbol synchronizing process (Step S410). Subsequently, the mobile station 30 measures the reception quality of a signal transmitted by the target base station (Step S411), turns the corresponding frequency back to the frequency of the serving base station (Step S416), and sends a measurement result to the serving base station (Step S417).

Upon selection of the method without the timing synchronizing in step S407 (No in step S409), the mobile station 30 determines the position of the FFT window in accordance with any of the methods illustrated in FIGS. 2 to 4 (Step S412). The station 30 executes a process for measuring the reception quality of a signal transmitted by the target base station (Step S413). The station 30 repeatedly determines whether the process is completed at all of the timings in the maximum delay time difference, until the scanning period elapses (No in step S414). When it is determined that the process is completed (Yes in step S414), the station 30 selects the optimum value as a measurement value (Step S415). The station 30 turns the frequency for transmission and reception back into the frequency of the target base station (Step S416), and sends the measurement result to the radio base station (step S417).

As described above, by using the reception quality measurement method according to this embodiment, it is possible to select a different frequency scanning method suitable for the state of the mobile station and the scanning condition thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile station comprising:
a communication control unit which sets a predetermined period including a synchronizing timing for a first radio base station, in response to an instruction from the first radio base station forming a cell in which the mobile station exists, for measuring a reception quality of a signal sent by a second radio base station forming a cell with a frequency different from a frequency used in the cell of the first radio base station;
a timing setting unit which sets a plurality of measurement timings in the period set by the communication control unit so as to initiate, at each of the measurement timings, a measurement of the reception quality of the signal sent by the second radio base station;
a reception quality comparing unit which compares the reception qualities measured at the measurement timings set by the timing setting unit, and selects an optimum reception quality therefrom; and
a control information generating unit which reports the optimum reception quality selected by the reception quality comparing unit to the first radio base station as the reception quality of the signal sent by the second radio base station.

2. The mobile station according to claim 1, wherein the timing setting unit sets, as the measurement timing, each timing which has been shifted by a guard interval length based on a timing at which the signal sent from the first radio base station is received.

3. The mobile station according to claim 1, wherein the timing setting unit initiates the measurement of the reception quality at each measurement timing in an order that is set based on the synchronizing timing at the first radio base station, and, when a predetermined period elapses, stops the measurement of the reception quality at a measurement timing at which the measurement has not been executed yet.

4. The mobile station according to claim 1, wherein the timing setting unit initiates the measurement of the reception quality at each measurement timing in an order that is set based on a timing at which the optimum reception quality has previously been measured at the second radio base station, and, when a predetermined period elapses, stops the measurement of the reception quality at a measurement timing at which the measurement has not been executed yet.

5. The mobile station according to claim 1, wherein the communication control unit sets the period, in response to an instruction from the first radio base station.

6. The mobile station according to claim 1, further comprising:
a timing adjustment unit which adjusts the measurement timing based on an amount of phase rotation obtained from a measurement result of the reception quality at each measurement timing, and initiates the measurement of the reception quality of the signal sent by the second radio base station also at each measurement timing after adjustment.

7. The mobile station according to claim 6, wherein the communication control unit does not initiate the timing adjustment unit to adjust the measurement timing when it is determined that a period for measuring the reception quality at all the measurement timings set by the timing setting unit and at all the measurement timings adjusted by the timing adjustment unit is longer than a previously set period.

8. The mobile station according to claim 7, wherein
the communication control unit changes a method of the measurement of the reception quality to a method for measuring the reception quality with an accuracy equal to or greater than a given accuracy even if the timing adjustment unit does not adjust the measurement timing, when the timing adjustment unit not initiated to adjust the measurement timing, and further informs the first radio base station of the measurement method after the change.

9. The mobile station according to claim 1, wherein the communication control unit selects either a system for comparing the reception qualities measured at each of the measurement timings set by the timing setting unit and selecting the optimum reception quality or a system for measuring the reception quality of the signal sent by the second radio base station after being synchronized with the signal sent by the radio base station, based on which process ends earlier.

10. The mobile station according to claim 1, wherein the communication control unit selects a system with a light processing load from a system for comparing the reception qualities measured at the measurement timings set by the timing setting unit and selecting the optimum reception quality and a system for measuring the reception quality of the signal sent by the second radio base station after being synchronized with the signal sent by the second radio base station.

11. The mobile station according to claim 1, wherein the timing setting unit initiates the measurement of the reception quality at each measurement timing in an order that is set based on a timing at which the optimum reception quality has previously been measured for each of a plurality of radio base stations, when an instruction from the first radio base station to measure the reception quality of the signals sent by the plurality of radio base stations including the second radio base station has been received, and stops the measurement of the reception quality at a measurement timing at which the measurement has not been executed yet, when a predetermined period elapses.

12. A reception quality measurement method comprising:
instructing, from a first radio base station, a mobile station existing in a cell formed by the radio base station to measure a reception quality of a signal sent by a second radio base station forming a cell with a frequency different from a frequency of the cell of the first radio base station;

setting a predetermined period including a synchronizing timing for the first radio base station, by the mobile station;

setting a plurality of measurement timings in the period, and measuring reception quality of the signals sent by the second radio base station at each of the measurement timings, by the mobile station;

comparing the reception qualities measured at the measurement timings, and selecting an optimum reception quality, by the mobile station; and reporting the selected optimum reception quality to the first radio base station as the reception quality of the signal sent by the second radio base station, by the mobile station.

* * * * *